United States Patent
Chang et al.

(10) Patent No.: US 9,832,757 B2
(45) Date of Patent: Nov. 28, 2017

(54) MOBILE TERMINAL AND PROCESSOR

(71) Applicant: KYOCERA CORPORATION, Kyoto (JP)

(72) Inventors: Henry Chang, San Diego, CA (US); Noriyoshi Fukuta, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/451,011

(22) Filed: Mar. 6, 2017

(65) Prior Publication Data

US 2017/0181126 A1 Jun. 22, 2017

Related U.S. Application Data

(62) Division of application No. 14/355,940, filed as application No. PCT/JP2012/078893 on Nov. 7, 2012.

(60) Provisional application No. 61/556,405, filed on Nov. 7, 2011.

(51) Int. Cl.
| | |
|---|---|
| *H04H 20/71* | (2008.01) |
| *H04W 72/00* | (2009.01) |
| *H04L 12/18* | (2006.01) |
| *H04W 88/02* | (2009.01) |
| *H04W 84/04* | (2009.01) |
| *H04W 92/04* | (2009.01) |

(52) U.S. Cl.
CPC ........... *H04W 72/005* (2013.01); *H04L 12/18* (2013.01); *H04W 84/045* (2013.01); *H04W 88/02* (2013.01); *H04W 92/045* (2013.01)

(58) Field of Classification Search
None
See application file for complete search history.

(56) References Cited

U.S. PATENT DOCUMENTS

| 8,660,049 B2 | 2/2014 | Katayama et al. |
| 2009/0088154 A1 | 4/2009 | Umatt et al. |
| (Continued) | | |

FOREIGN PATENT DOCUMENTS

| JP | 2010-541496 A | 12/2010 |
| JP | 2011-181993 | 9/2011 |
| (Continued) | | |

OTHER PUBLICATIONS

An Office Action; "Notice of Reasons for Rejection," issued by the Japanese Patent Office on Apr. 26, 2016, which aorresponds to Japanese Patent Application No. 2016-025563 and is related to U.S. Appl. No. 14/355,940; with English language statement of relevance.

(Continued)

*Primary Examiner* — Edan Orgad
*Assistant Examiner* — Rebecca Song
(74) *Attorney, Agent, or Firm* — Studebaker & Brackett PC (57) ABSTRACT

A mobile terminal is used in a mobile communication system including a general cell supporting a broadcast distribution of MBMS data and a specific cell not supporting a broadcast distribution of MBMS data. The mobile terminal has a controller that executes an autonomous search that searches for a specific cell to which the mobile terminal is allowed to connect. In an idle state, the controller halts the autonomous search when the user terminal receives the MBMS data from the general cell.

4 Claims, 4 Drawing Sheets

(56) References Cited

U.S. PATENT DOCUMENTS

| | | | | |
|---|---|---|---|---|
| 2010/0272004 A1* | 10/2010 | Maeda | ................ | H04L 5/0007 370/312 |
| 2011/0261743 A1 | 10/2011 | Futaki et al. | | |
| 2012/0236776 A1* | 9/2012 | Zhang | ................ | H04W 48/12 370/312 |
| 2012/0314642 A1* | 12/2012 | Xu | ................ | H04W 72/005 370/312 |
| 2013/0114405 A1 | 5/2013 | Kim et al. | | |

FOREIGN PATENT DOCUMENTS

| | | |
|---|---|---|
| WO | 2009/133764 A1 | 11/2009 |
| WO | 2010/073700 A1 | 7/2010 |
| WO | WO2011097855 A1 * | 8/2011 |

OTHER PUBLICATIONS

International Search Report; PCT/JP2012/078893; dated Feb. 5, 2013.
3GPP TS 36.300 V10.5.0 (Sep. 2009); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10); Sep. 2011; pp. 1-194.

* cited by examiner

MOBILE TERMINAL AND PROCESSOR

CROSS REFERENCE TO RELATED APPLICATIONS

This application is a Divisional Application of U.S. patent application Ser. No. 14/355,940 filed May 2, 2014, which is the U.S. National Phase Application of International Application No. PCT/JP2012/078893, filed Nov. 7, 2012, which claims benefit of U.S. Provisional Application No. 61/556,405 filed Nov. 7, 2011, the entire contents of which are incorporated herein by reference.

TECHNICAL FIELD

The present disclosure relates to a mobile communication method and a mobile terminal employed in a mobile communication system including a general cell supporting broadcasting of MBMS data and a specific cell not supporting broadcasting of the MBMS data.

BACKGROUND ART

Heretofore, there has been known a general cell (e.g., macrocell) supporting broadcasting of MBMS data. There has also been known a specific cell referred to as a CSG (Closed Subscriber Group) cell, a homecell, or a femtocell, for example.

Note that an access type can be set for a specific cell. The access types include "Closed," "Hybrid," and "Open."

A specific cell does not support broadcasting of MBMS data. Hence, when a mobile terminal performs handover from a general cell to a specific cell or changes the selected cell from a general cell to a specific cell, the mobile terminal cannot acquire information on MBMS data in the specific cell.

PRIOR ART DOCUMENT

Non-Patent Document

Non-patent document 1: 3GPP TS 36.300 V10.5.0

SUMMARY

A mobile terminal for a mobile communication system including a general cell that supports broadcast delivery of Multimedia Broadcast Multicast Services (MBMS) data and a specific cell that does not support broadcast delivery of MBMS data, the mobile terminal comprises: a controller configured to acquire minimum information required for receiving the MBMS data, from a broadcast multicast service center (BM-SC) via the specific cell, even if the mobile terminal exists in the specific cell. The controller is configured to acquire the minimum information by accessing the BM-SC via the specific cell, and the minimum information comprises: information of a geographical area in which the MBMS data is delivered; and information of a frequency at which the MBMS data is delivered.

A chipset to be equipped in a mobile terminal for a mobile communication system including a general cell that supports broadcast delivery of Multimedia Broadcast Multicast Services (MBMS) data and a specific cell that does not support broadcast delivery of MBMS data, the mobile terminal comprises: a processor and a memory, the processor configured to cause the mobile terminal to acquire minimum information required for receiving the MBMS data, from a broadcast multicast service center (BM-SC) via the specific cell, even if the mobile terminal exists in the specific cell. The processor is configured to acquire the minimum information by accessing the BM-SC via the specific cell, and the minimum information comprises: information of a geographical area in which the MBMS data is delivered; and information of a frequency at which the MBMS data is delivered.

DESCRIPTION OF THE EMBODIMENTS

A mobile communication system of embodiments of the present disclosure are described below by referring to the drawings. In the following description of the drawings, same or similar reference numerals are given to denote same or similar portions.

Note that the drawings are merely schematically shown and proportions of sizes and the like are different from actual ones. Therefore, specific dimensions and the like should be determined in consideration of the following description. Moreover, there are portions where dimensional relationships and ratios differ among drawings, as a matter of course.

[First Embodiment]

(Summary of First Embodiment)

A mobile communication method according to a first embodiment is a method for distributing MBMS data to a mobile terminal in a mobile communication system including a general cell supporting broadcasting of the MBMS data and a specific cell not supporting broadcasting of the MBMS data. The mobile communication method includes: a step A of broadcasting MBMS service information indicating contents of the MBMS data from the general cell; a step B of broadcasting MBMS service modification information from the general cell, the MBMS service modification information indicating that the MBMS service information is to be modified and indicating a period of broadcasting the MBMS service information; a step C of broadcasting the MBMS service modification information from the specific cell; and a step D of receiving, by the mobile terminal in the specific cell, the MBMS service information broadcasted from the general cell, during the period indicated by the MBMS service modification information broadcasted from the specific cell.

In the first embodiment, since the specific cell broadcasts MBMS service modification information, the mobile terminal can receive the MBMS service information broadcasted from the general cell. Therefore, the mobile terminal can continuously acquire information on the MBMS data (MBMS service information) even when it is camped on the specific cell.

A mobile communication method according to a first embodiment is a method for distributing MBMS data to a mobile terminal in a mobile communication system including a general cell supporting broadcasting of the MBMS data and a specific cell not supporting broadcasting of the MBMS data. The mobile communication method includes: a step A of broadcasting MBMS service information indicating contents of the MBMS data from the general cell; a step B of broadcasting MBMS service modification information from the specific cell, the MBMS service modification information indicating that the MBMS service information is to be modified and indicating a period of broadcasting the MBMS service information; a step C of broadcasting the MBMS service information from the specific cell during the period indicated by the MBMS service modification information, and a step D of receiving the MBMS service information broadcasted from the specific cell by the mobile terminal in the specific cell, during the period indicated by the MBMS service modification information broadcasted from the specific cell.

In the first embodiment, since the specific cell broadcasts MBMS service information and MBMS service modification information, the mobile terminal can receive the MBMS service information broadcasted from the specific cell. Therefore, the mobile terminal can continuously acquire information on the MBMS data (MBMS service information) even when it is camped on the specific cell.

A mobile communication method according to a first embodiment is a method for distributing MBMS data to a mobile terminal in a mobile communication system including a general cell supporting broadcasting of the MBMS data and a specific cell not supporting broadcasting of the MBMS data. The mobile communication method includes: a step A of broadcasting MBMS service information indicating contents of the MBMS data from the general cell; a step B of acquiring the MBMS service information from the general cell by the specific cell, and transmitting from the specific cell the MBMS service information to the mobile terminal connected to the specific cell; a step C of receiving the MBMS service information from the specific cell by the mobile terminal connected to the specific cell.

In the first embodiment, MBMS service information is transmitted from the specific cell to the mobile terminal connected to the specific cell. In other words, MBMS service information is transmitted from the specific cell to the mobile terminal via a unicast connection. Hence, the mobile terminal can continuously acquire information on MBMS data (MBMS service information) even when it is connected to the specific cell.

Note that in the embodiment, the specific cell is preferably a cell arranged in small scale or in large scale. The specific cell is preferably a cell managed by a HNB (Home Node B), a HeNB (Home Evolved Node B), a femto BTS, or the like. To be specific, a radio base station managing the specific cell is a HNB, a HeNB, a femto BTS, or the like.

(Mobile Communication System)

Figure 1:
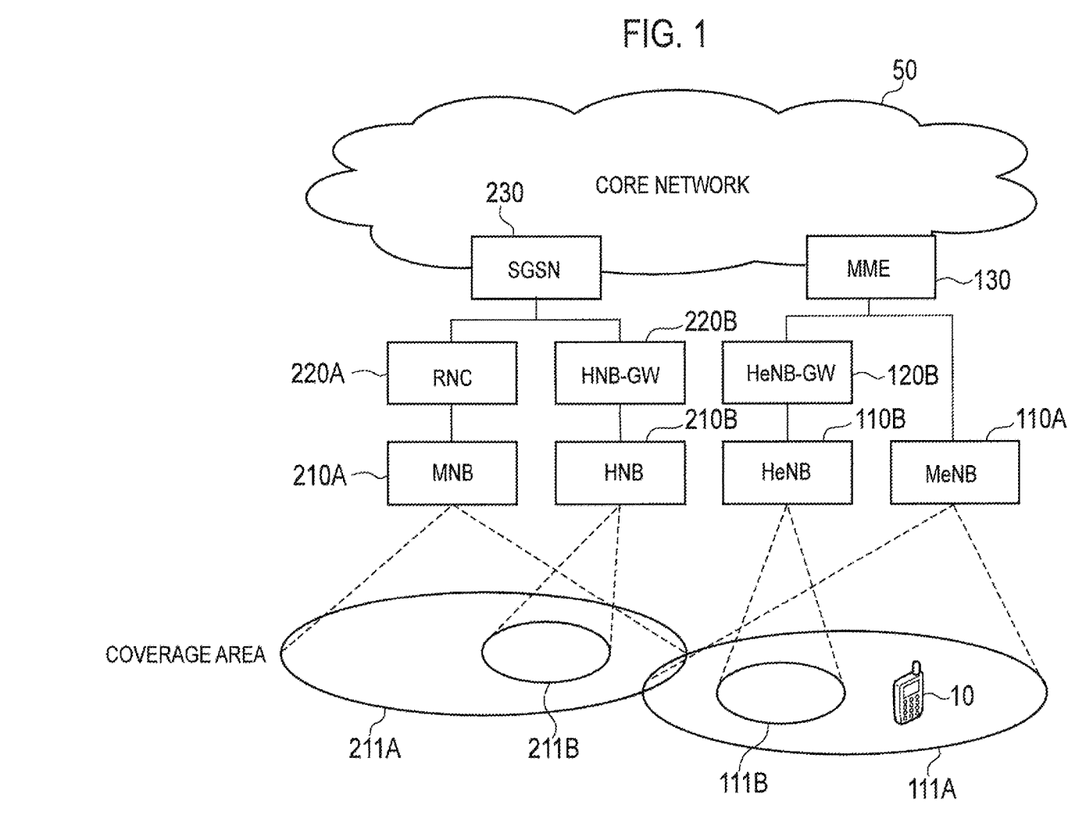
FIG. 1 is a diagram showing a mobile communication system 100 of a first embodiment to a third embodiment.

A mobile communication system of a first embodiment is described below. FIG. 1 is a diagram showing a mobile communication system 100 of the first embodiment.

As shown in FIG. 1, the mobile communication system 100 includes a radio terminal 10 (hereinafter, UE 10) and a core network 50. In addition, the mobile communication system 100 includes a first communication system and a second communication system.

The first communication system is a communication system supporting LTE (Long Term Evolution), for example. The first communication system includes, for example, abase station 110A (hereinafter, eNB 110A), a home base station 110B (hereinafter, HeNB 110B), a home base station gateway 120B (hereinafter, HeNB-GW 120B), and an MME 130.

Note that a radio access network (E-UTRAN; Evolved Universal Terrestrial Radio Access Network) corresponding to the first communication system is formed of the eNB 110A, the HeNB 110B, and the HeNB-GW 120B.

The second communication system is a communication system supporting UMTS (Universal Mobile Telecommunication System), for example. The second communication system includes a base station 210A (hereinafter, NB 210A), a home base station 210B (hereinafter, HNB 210B), an RNC 220A, a home base station gateway 220B (hereinafter, HNB-GW 220B), and an SGSN 230.

Note that a radio access network (UTRAN; Universal Terrestrial Radio Access Network) corresponding to the second communication system is formed of the NB 210A, the HNB 210B, the RNC 220A, and the HNB-GW 220B.

The UE 10 is a device (User Equipment) configured to communicate with the second communication system or the first communication system. For example, the UE 10 has a function to perform radio communications with the eNB 110A and the HeNB 110B. Alternatively, the UE 10 has a function to perform radio communications with the NB 210A and the HNB 210B.

The eNB 110A manages a general cell 111A, and is a device (evolved NodeB) for performing radio communications with the UE 10 in the general cell 111A.

The HeNB 110B manages a specific cell 111B, and is a device (Home evolved NodeB) for performing radio communications with the UE 10 in the specific cell 111B.

The HeNB-GW 120B is connected to the HeNB 110B, and is a device (Home evolved NodeB Gateway) for managing the HeNB 110B.

The MME 130 is connected with the eNB 110A, and is a device (Mobility Management Entity) for managing mobility of the UE 10 which establishes a radio connection with the HeNB 110B. The MME 130 is also connected to the HeNB 110B via the HeNB-GW 120B, and is a device for managing mobility of the UE 10 which establishes a radio connection with the HeNB 110B.

The NB 210A manages a general cell 211A, and is a device (NodeB) for performing radio communications with the UE 10 in the general cell 211A.

The HNB 210B manages a specific cell 211B, and is a device (Home NodeB) for performing radio communications with the UE 10 in the specific cell 211B.

The RNC 220A is connected to the NB 210A, and is a device (Radio Network Controller) for establishing a radio connection (RRC Connection) with the UE 10 in the general cell 211A.

The HNB-GW 220B is connected to the HNB 210B, and is a device (Home NodeB Gateway) for establishing a radio connection (RRC Connection) with the UE 10 in the specific cell 211B.

The SGSN 230 is a device (Serving GPRS Support Node) for exchanging packets in a packet exchange domain. The SGSN 230 is provided in the core network 50. Although omitted in FIG. 1, a device (MSC; Mobile Switching Center) for switching lines in a line switching domain may be provided in the core network 50.

Note that the general cell and the specific cell should be understood as functions for performing radio communications with the UE 10. However, the general cell and the specific cell are also used as terms indicating coverage areas of cells. In addition, a cell such as the general cell or the specific cell is identified by a frequency, a spreading code, a time slot or the like used in the cell.

The specific cell is sometimes referred to as a femtocell, a CSG (Closed Subscriber Group) cell, a homecell or the like. Moreover, the specific cell is configured such that an access type can be set therefore. The access type is set to define the UEs 10 allowed access to the specific cell. The access types include "Closed," "Hybrid," and "Open."

A "Closed" specific cell is configured such that services may be provided only to the UE 10 (UE; User Equipment) managed by the specific cell.

A "Hybrid" specific cell is configured such that the UE 10 managed by the specific cell is allowed to communicate with high quality, whereas the UE 10 not managed by the specific cell is allowed to communicate with best-effort quality, for example.

An "Open" specific cell is configured such that services may be provided to all of the UEs 10 as in the case of the general cell. Here, in the "Open" cell, UEs 10 can perform communications with equal quality without being distinguished as to whether the UEs 10 are managed by the specific cell.

Note that the access type may be "ACCESS CLASS BARRED" which prohibits access by the UE 10 depending on the access class, or "CELL BARRED" which prohibits access by the UE 10 depending on the cell.

Hereinbelow, the first communication system will be mainly described. It is to be noted that the following description may be applied to the second communication system.

In the first communication system, OFDMA (Orthogonal Frequency Division Multiple Access) is employed as a downlink multiplexing scheme, and SC-FDMA (Single-Carrier Frequency Division Multiple Access) is employed as an uplink multiplexing scheme.

In addition, in the first communication system, an uplink control channel (PUCCH; Physical Uplink Control Channel), an uplink shared channel (PUSCH; Physical Uplink Shared Channel) and the like are used as uplink channels. Meanwhile, a downlink control channel (PDCCH; Physical Downlink Control Channel), a downlink shared channel (PDSCH; Physical Downlink Shared Channel) and the like are used as downlink channels.

An uplink control channel is a channel for conveying a control signal. The control signal includes a CQI (Channel Quality Indicator), a PMI (Precoding Matrix Indicator), an RI (Rank Indicator), an SR (Scheduling Request), and an ACK/NACK, for example.

A CQI is a signal being a notification of a recommended modulation scheme and coding rate to be used in downlink transmission. A PMI is a signal indicating a precoder matrix preferably used in downlink transmission. An RI is a signal indicating the number of layers (streams) to be used in downlink transmission. An SR is a signal for requesting allocation of an uplink radio resource (resource block to be described later). An ACK/NACK is a signal indicating whether or not a signal transmitted through a downlink channel (e.g., PDSCH) is received successfully.

An uplink shared channel is a channel for conveying a control signal (including the control signals described above) and/or a data signal. For example, an uplink radio resource is in some cases allocated only to a data signal, and in other cases allocated in such a manner that a data signal and a control signal are multiplexed.

A downlink control channel is a channel for conveying a control signal. The control signal is Uplink SI (Scheduling Information), Downlink SI (Scheduling Information), or a TPC bit, for example.

Uplink SI is a signal indicating allocation of an uplink radio resource. Downlink SI is a signal indicating allocation of a downlink radio resource. A TPC bit is a signal for instructing increase or decrease in power for a signal transmitted through an uplink channel.

A downlink shared channel is a channel for conveying a control signal and/or a data signal. For example, a downlink radio resource is in some cases allocated only to a data signal, and in other cases allocated in such a manner that a data signal and a control signal are multiplexed.

The control signal to be transmitted through a downlink shared channel includes a TA (Timing Advance). A TA is information for correcting a transmission timing between the UE 10 and the eNB 110A, and is measured by the eNB 110A on the basis of an uplink signal transmitted from the UE 10.

The control signal to be transmitted through a channel other than the downlink control channel (PDCCH) or the downlink shared channel (PDSCH) includes an ACK/NACK. An ACK/NACK is a signal indicating whether or not a signal transmitted through an uplink channel (e.g., PUSCH) is received successfully.

In the first embodiment, a general cell is a cell supporting broadcasting of MBMS data. The general cell broadcasts MBMS service information indicating contents of MBMS data (program guide). Alternatively, the general cell broadcasts MBMS service modification information indicating that MBMS service information is to be modified and indicating the timing at which the MBMS service information is modified. For example, the general cell transmits MBMS data through an MTCH (Multicast Traffic Channel). The general cell also transmits MBMS service information indicating contents of MBMS data (program guide) through an MCCH (Multicast Control Channel). Alternatively, the general cell transmits MBMS information through the MTCH.

In contrast, a specific cell is a cell not supporting broadcasting of MBMS data. Thus, it is to be noted that the specific cell does not have a function of broadcasting MBMS data, and generally does not broadcast MBMS service information or MBMS service modification information. Still, the specific cell can transmit MBMS data to the UE 10 connected to the specific cell and thus in a connected state. For example, the specific cell can transmit MBMS data by using the PDSCH.

The general cell and the specific cell broadcast broadcast-information through a broadcast channel (BCCH; Broadcast Control Channel). Broadcast-information is information such as an MIB (Master Information Block), an SIB (System Information Block), and the like, for example.

(Radio Frame)

Figure 2:
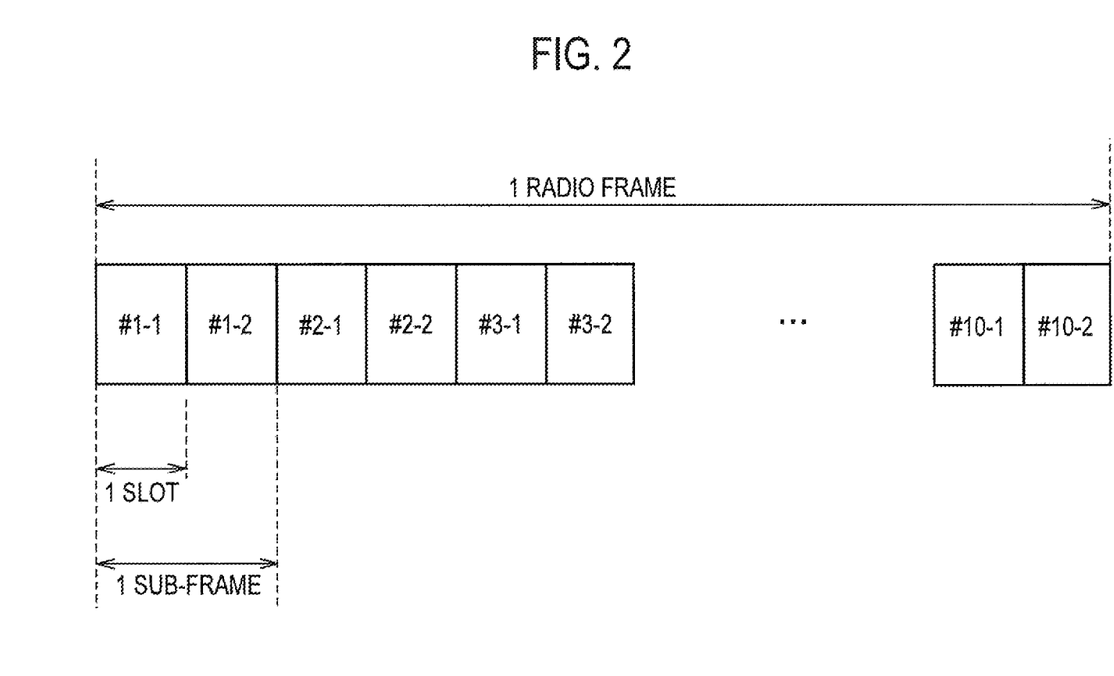
FIG. 2 is a diagram showing a radio frame of the first embodiment to the third embodiment.

A radio frame of the first communication system is described below. FIG. 2 is a diagram showing a radio frame of the first communication system.

As shown in FIG. 2, a single radio frame includes 10 sub-frames. A single sub-frame includes two slots. A time length of a single slot is 0.5 msec, a time length of a single sub-frame is 1 msec, and a time length of a single radio frame is 10 msec.

Note that a single slot is formed of multiple OFDM symbols (e.g., six or seven OFDM symbols) in the downlink. Similarly, a single slot is formed of multiple SC-FDMA symbols (e.g., six or seven SC-FDMA symbols) in the uplink.

(Radio Resource)

Figure 3:
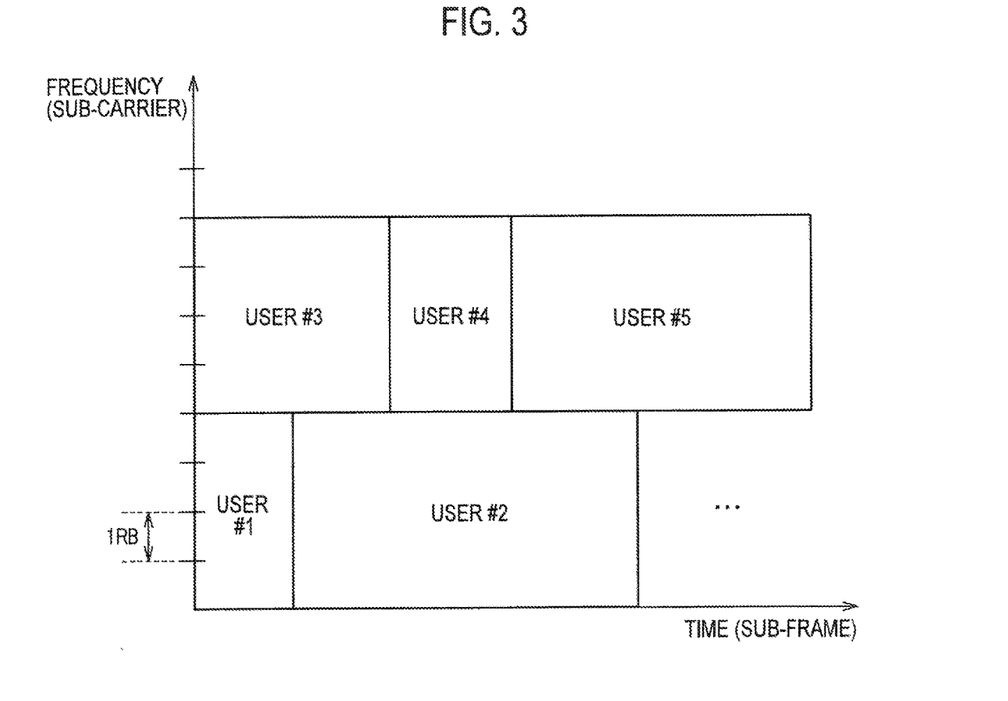
FIG. 3 is a diagram showing radio resource of the first embodiment to the third embodiment.

Radio resource of the first communication system is described below. FIG. 3 is a diagram showing radio resource of the first communication system.

As shown in FIG. 3, radio resource is defined by a frequency axis and a time axis. Frequency includes multiple sub-carriers. A predetermined number of sub-carriers (12 sub-carriers) are collectively referred to as a resource block (RB: Resource Block). As described above, time is divided into units such as OFDM symbols (or SC-FDMA symbols), slots, sub-frames, radio frames, and the like.

Radio resource can be allocated in units of resource blocks. Radio resource can be divided on the frequency axis and on the time axis to be allocated to multiple users (e.g., user #1 to user #5).

The eNB 110A allocates the radio resource. The eNB 110A allocates the radio resource to the UEs 10 on the basis of CQI, PMI, RI, and the like.

(Configuration of UE)

Figure 4:
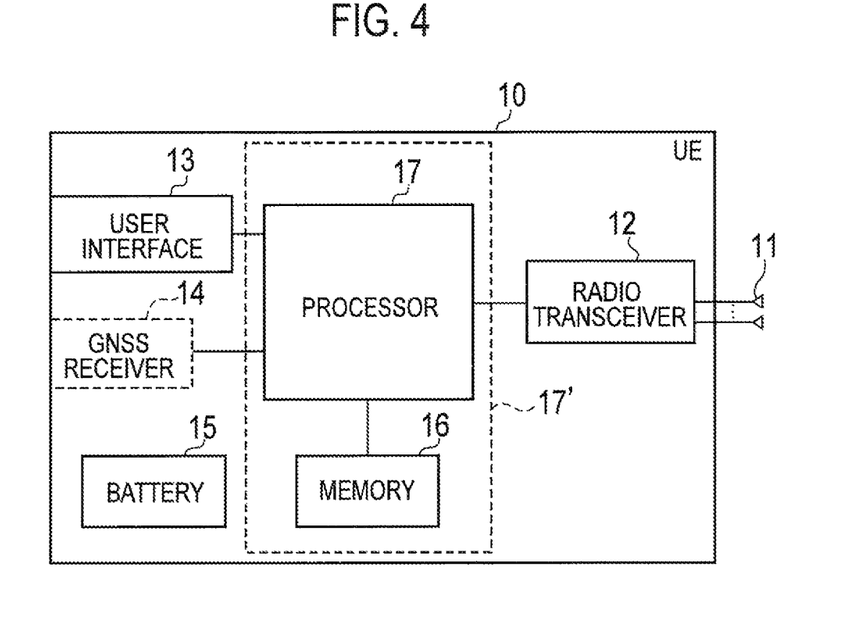
FIG. 4 is a block diagram of a mobile terminal of the first embodiment to the third embodiment.

FIG. 4 is a block diagram of the UE 10. As shown in FIG. 4, the UE 10 has an antenna 11, a radio transceiver 12, a user interface 13, a GNSS (Global Navigation Satellite System) receiver 14, a battery 15, a memory 16, and a processor 17. The memory 16 and the processor 17 constitute a controller.

The UE 10 may not have the GNSS receiver 14. In addition, the memory 16 is integrated with the processor 17, and this set (that is, a chipset) may be called a processor 17'.

The antenna 11 and the radio transceiver 12 are used to transmit and receive a radio signal. The antenna 11 includes a plurality of antenna elements. The radio transceiver 12 converts a baseband signal output from the processor 17 into the radio signal, and transmits the radio signal from the antenna 11. Furthermore, the radio transceiver 12 converts the radio signal received by the antenna 11 into the baseband signal, and outputs the baseband signal to the processor 17.

The user interface 13 is an interface with a user carrying the UE 10, and includes, for example, a display, a microphone, a speaker, and various buttons. The user interface 13 receives an operation from a user and outputs a signal indicating the content of the operation to the processor 17.

The GNSS receiver 14 receives a GNSS signal in order to obtain location information indicating a geographical location of the UE 10, and outputs the received signal to the processor 17.

The battery 15 stores a power to be supplied to each block of the UE 10.

The memory 16 stores a program to be executed by the processor 17 and information to be used for a process by the processor 17.

The processor 17 includes a baseband processor configured to perform modulation and demodulation, coding and decoding and the like of the baseband signal, and a CPU (Central Processing Unit) configured to perform various processes by executing the program stored in the memory 16. The processor 17 may further include a codec that performs encoding and decoding of sound and video signals. The processor 17 performs various processes which will be described later.

(Mobile Communication Method)

A mobile communication method of the first embodiment is described below using three cases.

(Case 1)

A description is given below of a case where MBMS service information is broadcasted from a general cell, and MBMS service modification information is broadcasted from a specific cell. The UE 10 is in the specific cell. It is to be noted that the term "in the cell" indicates both the idle state and the connected state.

Specifically, in case 1, the mobile communication method includes: a step A of broadcasting MBMS service information indicating contents of MBMS data from the general cell; a step B of broadcasting MBMS service modification information from the general cell, the MBMS service modification information indicating that the MBMS service information is to be modified and indicating a period (e.g., MCCH modification Period) of broadcasting the MBMS service information; a step C of broadcasting the MBMS service modification information from the specific cell; and a step D of receiving by the UE 10 in the specific cell the MBMS service information broadcasted from the general cell, during the period indicated by the MBMS service modification information broadcasted from the specific cell.

In step C, the specific cell preferably suspends transmission of downlink data through a downlink shared channel during the period indicated by the MBMS service modification information.

Thus, regardless of whether or not the frequency used in the specific cell is the same as the frequency used in the general cell, it is possible to prevent a problem that downlink data transmitted from the specific cell through the downlink shared channel cannot be received due to monitoring of the MBMS service information broadcasted from the general cell.

Moreover, if the frequency used in the specific cell is the same as the frequency used in the general cell, downlink data transmitted from the specific cell through the downlink shared channel and the MBMS service information broadcasted from the general cell do not interfere with each other in the UE 10.

In case 1, the mobile communication method may further include a step E of acquiring the MBMS service modification information through an interface of the mobile communication system. Note that the interface of the mobile communication system is an inter-base station interface (X2 interface), an interface connected through a core network (S1 interface), or the like.

Alternatively, in case 1, the mobile communication method may further include a step E of acquiring the MBMS service modification information by the specific cell through monitoring of the MBMS service modification information broadcasted from the general cell. In this case, if the frequency used in the specific cell is the same as the frequency used in the general cell, the specific cell may control the UE 10 in the specific cell so as to suspend transmission of uplink data during the period in which the MBMS service modification information is broadcasted from the general cell. For example, the specific cell transmits to the UE 10 an instruction to suspend transmission of uplink data during the period in which the MBMS service modification information is broadcasted from the general cell. Thus, uplink data transmitted from the UE 10 and the MBMS service modification information broadcasted from the general cell do not interfere with each other in the specific cell.

(Case 2)

A description is given below of a case where MBMS service information and MBMS service modification information are broadcasted from a specific cell. The UE 10 is in the specific cell. It is to be noted that the term "in the cell" indicates both the idle state and the connected state.

Specifically, in case 2, the mobile communication method includes: a step A of broadcasting MBMS service information indicating contents of MBMS data from a general cell; a step B of broadcasting MBMS service modification information from the specific cell, the MBMS service modification information indicating that the MBMS service information is to be modified and indicating a period (e.g., MCCH modification Period) of broadcasting the MBMS service information; a step C of broadcasting the MBMS service information from the specific cell during the period indicated by the MBMS service modification information;

and a step D of receiving by the mobile terminal in the specific cell the MBMS service information broadcasted from the specific cell, during the period indicated by the MBMS service modification information broadcasted from the specific cell.

In case 2, the mobile communication method may further include a step E of acquiring the MBMS service information through an interface of the mobile communication system. Note that the interface of the mobile communication system is an inter-base station interface (X2 interface), an interface connected through a core network (S1 interface), or the like.

Alternatively, in case 2, the mobile communication method may further include a step E of acquiring the MBMS service information by the specific cell through monitoring of the MBMS service information broadcasted from the general cell. For example, the specific cell monitors the MBMS service modification information broadcasted from the general cell, identifies a period in which the MBMS service information is broadcasted from the general cell, and monitors the MBMS service information during the identified period to thereby acquire the MBMS service information. In this case, if the frequency used in the specific cell is the same as the frequency used in the general cell, the specific cell may control the UE 10 in the specific cell so as to suspend transmission of uplink data during the period in which the MBMS service information is broadcasted from the general cell. For example, the specific cell may transmit to the UE 10 an instruction to suspend transmission of uplink data during the period in which the MBMS service information is broadcasted from the general cell. In this case, the specific cell may control the UE 10 in the specific cell so as to suspend transmission of uplink data during the period in which the MBMS service modification information is broadcasted from the general cell. For example, the specific cell may transmit to the UE 10 an instruction to suspend transmission of uplink data during the period in which the MBMS service modification information is broadcasted from the general cell. Thus, uplink data transmitted from the UE 10 and the MBMS service information broadcasted from the general cell do not interfere with each other in the specific cell.

Note that since the MBMS service modification information is broadcasted from the specific cell in case 2, the specific cell can set an arbitrary period to broadcast the MBMS service information. In other words, a timing at which the MBMS service information is broadcasted from the specific cell may differ from a timing at which the MBMS service information is broadcasted from the general cell. To be more precise, contents of the MBMS service modification information broadcasted from the specific cell may differ from contents of the MBMS service modification information broadcasted from the general cell.

(Case 3)

A description is given below of a case where a specific cell transmits MBMS service information via a unicast connection. The UE 10 is in a connected state in the specific cell.

Specifically, in case 3, the mobile communication method includes: a step A of broadcasting MBMS service information indicating contents of MBMS data from a general cell; a step B of acquiring the MBMS service information from the general cell by the specific cell, and transmitting from the specific cell the MBMS service information to a mobile terminal connected to the specific cell; and a step C of receiving the MBMS service information from the specific cell by the mobile terminal connected to the specific cell.

In case 3, the mobile communication method may further include a step D of acquiring the MBMS service information through an interface of the mobile communication system. Note that the interface of the mobile communication system is an inter-base station interface (X2 interface), an interface connected through a core network (S1 interface), or the like.

Alternatively, in case 3, the mobile communication method may further include a step D of acquiring the MBMS service information by the specific cell through monitoring of the MBMS service information broadcasted from the general cell. For example, the specific cell monitors the MBMS service modification information broadcasted from the general cell, identifies a period in which the MBMS service information is broadcasted from the general cell, and monitors the MBMS service information during the identified period to thereby acquire the MBMS service information. In this case, if the frequency used in the specific cell is the same as the frequency used in the general cell, the specific cell may control the UE 10 in the specific cell so as to suspend transmission of uplink data during the period in which the MBMS service information is broadcasted from the general cell. For example, the specific cell may transmit to the UE 10 an instruction to suspend transmission of uplink data during the period in which the MBMS service information is broadcasted from the general cell. In this case, the specific cell may control the UE 10 in the specific cell so as to suspend transmission of uplink data during the period in which the MBMS service modification information is broadcasted from the general cell. For example, the specific cell may transmit to the UE 10 an instruction to suspend transmission of uplink data during the period in which the MBMS service modification information is broadcasted from the general cell. Thus, uplink data transmitted from the UE 10 and the MBMS service information broadcasted from the general cell do not interfere with each other in the specific cell.

It is to be noted that since the MBMS service information is transmitted via a unicast connection in case 3, broadcasting of the MBMS service modification information from the specific cell is unnecessary.

(Effects and Advantages)

In case 1, the MBMS service modification information is broadcasted from the specific cell, and thus the mobile terminal can receive the MBMS service information broadcasted from the general cell. Accordingly, the mobile terminal can continuously acquire information on the MBMS data (MBMS service information) even when it is camped on the specific cell.

In case 2, the MBMS service information and the MBMS service modification information are broadcasted from the specific cell, and thus the mobile terminal can receive the MBMS service information broadcasted from the specific cell. Accordingly, the mobile terminal can continuously acquire information on the MBMS data (MBMS service information) even when it is camped on the specific cell.

In case 3, the MBMS service information is transmitted from the specific cell to the mobile terminal connected to the specific cell via a unicast connection. Accordingly, the mobile terminal can continuously acquire information on the MBMS data (MBMS service information) even when it is camped on the specific cell.

[Second Embodiment]

Hereinafter, a second embodiment will be described while focusing on differences from the first embodiment. Although an operation of performing a cell reselection between the specific cell and the general cell has not been described especially in the first embodiment, the second embodiment is an embodiment relating to the cell reselection.

A mobile terminal (UE 10) according to the second embodiment is used in a mobile communication system including a general cell supporting a broadcast distribution of MBMS data and a specific cell not supporting a broadcast distribution of the MBMS data. The mobile terminal includes a controller (processor 17) that performs an autonomous search to search the specific cell to which the mobile terminal is allowed to connect. The controller is configured to halt the autonomous search when the mobile terminal in an idle state receives the MBMS data from the general cell.

A processor according to the second embodiment is equipped in a mobile terminal used in a mobile communication system including a general cell supporting a broadcast distribution of MBMS data and a specific cell not supporting a broadcast distribution of the MBMS data. The processor executes an autonomous search to search the specific cell to which the mobile terminal is allowed to connect. The processor is configured to halt the autonomous search when the mobile terminal in an idle state receives the MBMS data from the general cell.

The autonomous search is an operation of searching a specific cell having a CSG ID included in a white list stored in the UE 10, i.e. a specific cell to which the UE 10 is allowed to connect. The UE 10 performs the autonomous search to detect a specific cell which is discovered by the UE 10 in the past and which belongs to a frequency different from a frequency of a serving cell.

The specific cell, specifically a cell managed by a home base station (HNB, HeNB), does not support a broadcast distribution of MBMS data. Therefore, in a case where the UE 10 in an idle state receives (is receiving or interested to receive) MBMS data from a general cell, the UE 10 in the idle state cannot receive MBMS data when the UE 10 performs the cell reselection to the specific cell.

Therefore, in the second embodiment, the UE 10 halts the autonomous search when the UE 10 receives MBMS data from the general cell in the idle state. Moreover, the UE 10 sets a frequency distributing the MBMS data to the highest priority as a priority of the cell reselection when the UE 10 receives MBMS data from the general cell, in the idle state.

This enables the UE 10 to receive MBMS data from the specific cell, in the idle state. Moreover, it is possible for the UE 10 to reduce the processing load and the power consumption by halting the autonomous search.

[Third Embodiment]

Hereinafter, a third embodiment will be described while focusing on differences from the first embodiment. In the first embodiment, the specific cell broadcasts the MBMS service information and/or the MBMS service modification information.

However, besides such information, it is necessary to acquire MBMS basic information (i.e. minimum information necessary for receiving MBMS data) in order to receive MBMS data. Such the MBMS basic information is called USD (User Service Description).

A mobile terminal (UE 10) according to the third embodiment is used in a mobile communication system including a general cell supporting a broadcast distribution of MBMS data and a specific cell not supporting a broadcast distribution of the MBMS data. The mobile terminal includes a controller (processor 17) configured to acquire, from the specific cell, minimum information necessary for receiving the MBMS data when the mobile terminal exists in the specific cell.

The minimum information may include an identifier of service that provides the MBMS data. Such service identifier is called TMGI (Temporary Mobile Group Identifier).

The minimum information may include information that indicates a start time (session start time) of distributing the MBMS data. Moreover, the minimum information may include information that indicates an end time (session end time) of distributing the MBMS data.

The minimum information may include information that indicates a frequency in which the MBMS data is distributed.

The minimum information may include information that indicates a geographic area in which the MBMS data is distributed.

A processor according to the third embodiment is equipped in a mobile terminal used in a mobile communication system including a general cell supporting a broadcast distribution of MBMS data and a specific cell not supporting a broadcast distribution of the MBMS data. The processor is configured to acquire, from the specific cell, minimum information necessary for receiving the MBMS data when the mobile terminal exists in the specific cell.

This enables the UE 10 to acquire, from the specific cell, minimum information necessary for receiving MBMS data when the UE 10 exists in the specific cell. Thereby it is possible to set the state capable of receiving the MBMS data.

The minimum information is distributed from a MBMS server device (Broadcast Multicast Service Centre) provided in the core network 50 as a NAS (Non Access Stratum) message. UE 10, in a state connecting to the specific cell (connected state), accesses to the MBMS server device via the specific cell, and then acquires the NAS message.

[Other Embodiments]

The present disclosure has been described by using the above embodiment of the present disclosure. However, it should not be understood that the description and drawings which constitute part of this disclosure limit the present disclosure. From this disclosure, various alternative embodiments, examples, and operation techniques will be easily found by those skilled in the art.

In the aforementioned second embodiment, a cell reselection in a case where the frequency of the general cell is different from the frequency of the specific cell is assumed. When the frequency of the general cell is identical with the frequency of the specific cell, the UE 10 receiving MBMS data from the general cell in an idle state may be affected by an interference from the specific cell. Therefore, if the frequency of the general cell is identical with the frequency of the specific cell, the UE 10 receiving MBMS data from the general cell in an idle state may set the specific cell, to which the UE 10 is allowed to connect, to the highest priority as the priority of cell reselection. When the UE 10 is interested to receive MBMS data after changing the serving cell to the specific cell, the UE 10 connects to the specific cell, and then can receive MBMS data from the specific cell by unicast.

INDUSTRIAL APPLICABILITY

As described, the present disclosure is useful in radio communications field such as mobile communications.

The invention claimed is:

1. A mobile terminal for a mobile communication system including a general cell that supports broadcast delivery of Multimedia Broadcast Multicast Services (MBMS) data and a specific cell that does not support broadcast delivery of MBMS data, the mobile terminal comprising:

a processor; and a memory communicatively coupled to the processor, wherein the processor is configured to receive first information via the specific cell, the first information originally transmitted in a transmission path that does not include the general cell, the transmission path being from a broadcast multicast service center (BM-SC) to the user terminal, the first information required for receiving the MBMS data, when the mobile terminal exists in the specific cell, wherein the first information individually comprises:

information indicating a geographical area in which the MBMS data is delivered;

information indicating a frequency at which the MBMS data is delivered; and information indicating an identifier of service by which the MBMS data is provided.

2. The mobile terminal according to claim 1, wherein the first information further comprises information of delivery start time of the MBMS data.

3. A chipset to be equipped in a mobile terminal for a mobile communication system including a general cell that supports broadcast delivery of Multimedia Broadcast Multicast Services (MBMS) data and a specific cell that does not support broadcast delivery of MBMS data, the chipset comprising:

a processor; and a memory communicatively coupled to the processor, wherein the processor is configured to cause the mobile terminal to receive first information via the specific cell, the first information originally transmitted in a transmission path that does not include the general cell, the transmission path being from a broadcast multicast service center (BM-SC) to the user terminal, the first information required for receiving the MBMS data, when the mobile terminal exists in the specific cell, wherein the first information individually comprises:

information indicating a geographical area in which the MBMS data is delivered;

information indicating a frequency at which the MBMS data is delivered; and information indicating an identifier of service by which the MBMS data is provided.

4. A system for mobile communication, comprising:

a broadcast multicast service center (BM-SC)

a general cell that supports broadcast delivery of Multimedia Broadcast Multicast Services (MBMS) data;

a specific cell that does not support broadcast delivery of MBMS data; and a mobile terminal, wherein the BM-SC transmits first information to the mobile terminal via the specific cell, the first information originally transmitted in a transmission path that does not include the general cell, the transmission path being from a broadcast multicast service center (BM-SC) to the user terminal, the first information required for receiving the MBMS data when the mobile terminal exists in the specific cell, and the first information comprises:

information indicating a geographical area in which the MBMS data is delivered;

information indicating a frequency at which the MBMS data is delivered; and information indicating an identifier of service by which the MBMS data is provided.

* * * * *